US008770438B2

(12) United States Patent
Cahill

(10) Patent No.: US 8,770,438 B2
(45) Date of Patent: Jul. 8, 2014

(54) PORTABLE CONTAINERS FOR ZIP TIES

(76) Inventor: Daniel A. Cahill, Rutherford, NJ (US)

( * ) Notice: Subject to any disclaimer, the term of this patent is extended or adjusted under 35 U.S.C. 154(b) by 120 days.

(21) Appl. No.: 13/089,011

(22) Filed: Apr. 18, 2011

(65) Prior Publication Data

US 2012/0261435 A1 Oct. 18, 2012

(51) Int. Cl.
*B65D 83/00* (2006.01)
*B65G 59/00* (2006.01)

(52) U.S. Cl.
USPC ............................ 221/281; 221/191; 221/307

(58) Field of Classification Search
USPC ................................. 221/281, 309, 307, 191
See application file for complete search history.

(56) References Cited

U.S. PATENT DOCUMENTS 3,733,478 A * 5/1973 Barker .......................... 362/387
4,410,084 A * 10/1983 Ladner ............................ 206/53
4,429,839 A * 2/1984 Jessamine ..................... 242/402
4,653,833 A * 3/1987 Czubernat et al. ............ 439/528
4,706,843 A * 11/1987 Thornton ........................ 221/48
4,840,319 A * 6/1989 Heleen et al. .............. 242/564.4
4,984,685 A * 1/1991 Douglas ........................ 206/702
5,103,977 A * 4/1992 Douglas ........................ 206/702
5,110,092 A * 5/1992 Blaha et al. .......... 254/134.3 FT
D336,581 S * 6/1993 Parker ............................ D6/518
5,261,625 A * 11/1993 Lanoue ...................... 242/129.8
5,918,786 A 7/1999 Wise
6,343,693 B1 2/2002 Finley
6,637,595 B1 10/2003 Frossard et al.
6,681,931 B2 1/2004 Finley
6,968,955 B2 * 11/2005 Steeber ......................... 206/702
7,032,792 B2 4/2006 Berry
7,198,151 B1 * 4/2007 Fomby .......................... 206/403
7,249,729 B2 * 7/2007 Moritz ....................... 242/588.6
7,357,274 B2 4/2008 Hewett
2006/0102507 A1 * 5/2006 Dalrymple .................... 206/470
2007/0138050 A1 6/2007 Dominey
2007/0215628 A1 9/2007 Tramontina

* cited by examiner

*Primary Examiner* — Michael K Collins
(74) *Attorney, Agent, or Firm* — Preti Flaherty Beliveau & Pachios LLP

(57) ABSTRACT

A container for carrying and dispensing at least one zip tie includes a housing having an outer wall and opposing upper and lower walls defining a substantially hollow interior. An inner wall is formed inside the housing to divide the housing interior into an inner cavity and an outer cavity, and the inner wall has at least one slot formed therein to define a passage between the inner cavity and the outer cavity. A flexible orifice is provided in the upper and lower walls. Another embodiment provides a container for zip ties that also includes a housing having an outer wall and opposing upper and lower walls defining a substantially hollow interior. A dispensing slot formed in the outer wall, and a friction fit passage formed on the outer wall adjacent to the dispensing slot. Yet another embodiment provides a container that combines the features of the first two embodiments.

8 Claims, 5 Drawing Sheets

PORTABLE CONTAINERS FOR ZIP TIES

BACKGROUND OF THE INVENTION

This invention relates generally to containers for carrying and dispensing zip ties and more particularly to portable containers that can be carried by law enforcement, security, and military personnel.

Law enforcement, security, and military personnel often need to temporarily restrain potentially threatening human beings, and in some cases animals. Such personnel frequently use zip ties (also referred to as cable ties or flex ties) for such restraints. Zip ties are lighter and less expensive than traditional handcuffs. A zip tie generally comprises a flexible plastic strap having a head attached to one end. The opposite end of the strap is formed into a pointed tip that can be inserted into a slot formed in the head to create a loop. Once the pointed tip is inserted into the head, a locking mechanism (typically a ratchet of some sort) prevents the strap from being pulled back out of the head.

Currently, zip ties for use as restraining devices can be carried in either an initiated state (i.e., with the pointed end of the zip tie inserted into the head so as to initiate the locking mechanism) or an uninitiated state. An initiated zip tie will define a loop having a circumference measuring the approximate length of the zip tie, assuming the pointed end is inserted into the head just enough to initiate the locking mechanism. For example, a 22-inch zip tie (which is a commonly used length) would define a loop having a nearly 7 inch diameter and taking up an area of approximately 38 square inches. Thus, carrying initiated zip ties presents challenges in that they take up a large area and usually must be suspended from other equipment. Such suspended zip ties can easily fall off or get caught on other equipment, thereby endangering the user. Initiated zip ties are also difficult to conceal on a person while maintaining ease of deployment. Carrying uninitiated zip ties also presents difficulties because of their length. For instance, a 22-inch zip tie is difficult to conceal, and if concealed, is very difficult to effectively deploy.

Accordingly, there is a need for an apparatus for carrying at least one zip tie in a manner that allows for a relatively small volume, ease of concealment, and ease of deployment.

SUMMARY OF THE INVENTION

The above-mentioned need is met by the present invention, one embodiment of which provides a container for carrying and dispensing at least one zip tie that includes a housing having an outer wall and opposing upper and lower walls defining a substantially hollow interior. An inner wall is formed inside the housing to divide the housing interior into an inner cavity and an outer cavity, and the inner wall has at least one slot formed therein to define a passage between the inner cavity and the outer cavity. A first flexible orifice is provided in the upper wall, and a second flexible orifice is provided in the lower wall. Another embodiment provides a container for carrying and dispensing at least one zip tie that also includes a housing having an outer wall and opposing upper and lower walls defining a substantially hollow interior. A dispensing slot is formed in the outer wall, and a friction fit passage is formed on the outer wall adjacent to the dispensing slot. Another embodiment of the present invention provides a container that combines the features of the first two embodiments.

DETAILED DESCRIPTION OF THE INVENTION

Figure 1:
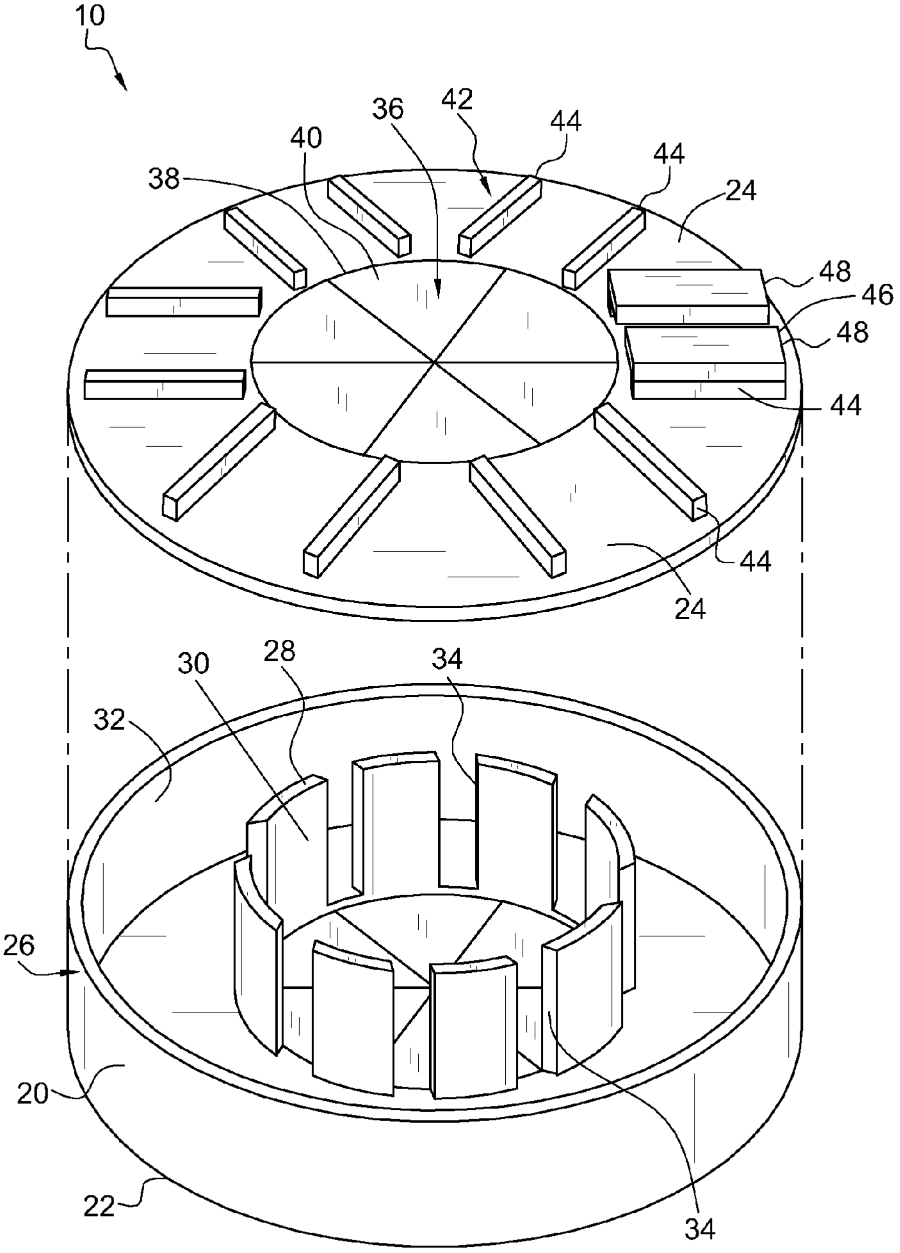
FIG. 1 is an exploded perspective view of one embodiment of a container for carrying and dispensing zip ties.
Figure 2:
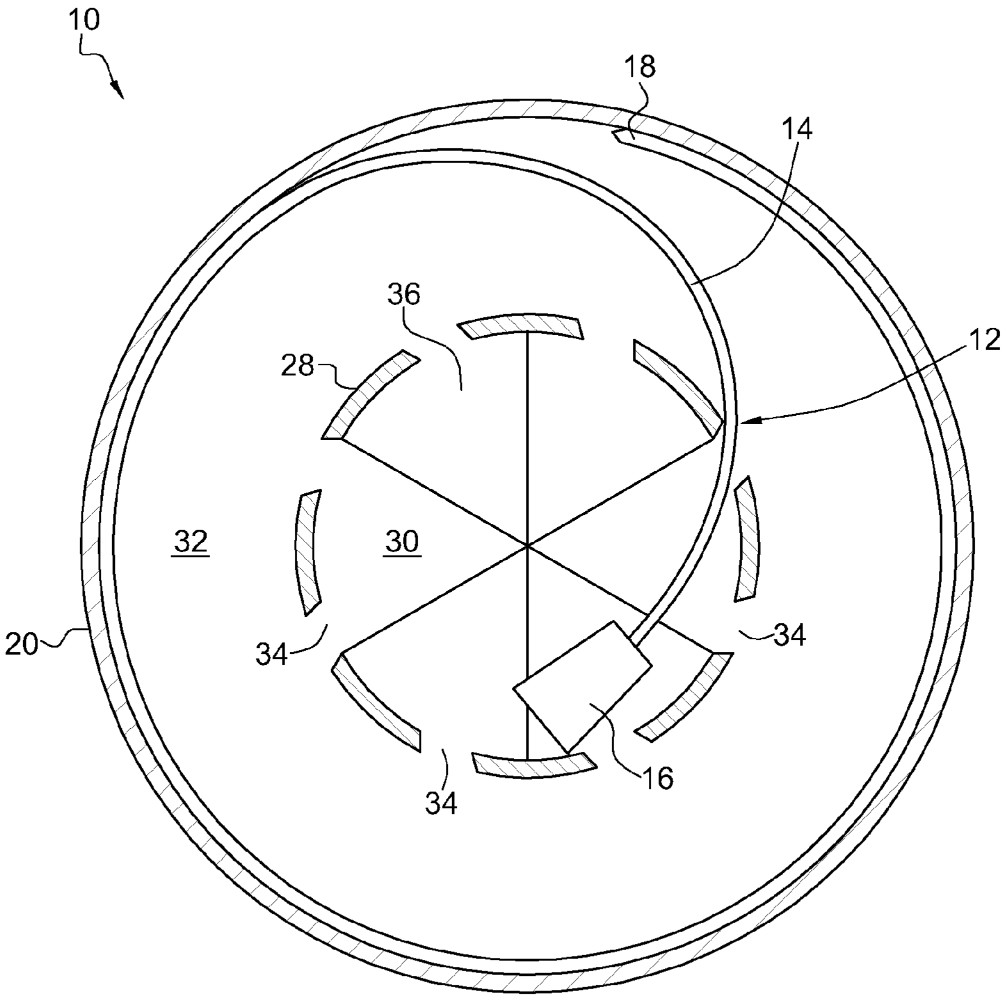
FIG. 2 is a sectional top view of the container of FIG. 1.

Referring to the drawings wherein identical reference numerals denote the same elements throughout the various views, FIGS. 1 and 2 show one embodiment of a container 10 for carrying and dispensing at least one zip tie 12 having a strap 14, a head 16 and a pointed tip 18.

The container 10 comprises an outer cylindrical wall 20 and opposing, disk-shaped upper and lower walls 22, 24. The upper wall 22 is attached to the top of the outer cylindrical wall 20, and the lower wall 24 is attached to the bottom of the outer cylindrical wall 20 to define an enclosure or housing 26 having a substantially hollow interior. The housing 26 can be fabricated in any suitable manner from any suitable material, such as injection molded plastic. It should be noted that directional terms, such as "top," "bottom," "upper," "lower" and the like are used herein simply with reference to the orientation of the drawings being described. Because the various components of the present invention can be positioned in a number of different orientations, the directional terminology is used for purposes of illustration only and is in no way limiting.

The housing 26 is generally cylindrical in shape (although other shapes, such as oval, are possible), with a height that is substantially less than its diameter. The diameter of the housing 26 is sufficient to contain a coiled zip tie of a desired length in the manner described below. The height of the outer cylindrical wall 20, and thus the height of the housing 26, is slightly greater than the width of the zip tie intended to be stored in the container 10. For example, the height can be approximately 10 percent greater than the zip tie width.

An inner cylindrical wall 28 formed inside the housing 26 divides the housing interior into an inner cavity 30 and an outer cavity 32. The inner cylindrical wall 28 has a diameter that is approximately one-half of the diameter of the outer cylindrical wall 20 and is positioned concentrically with the outer cylindrical wall 20. The inner cavity 30 is thus the cylindrical space defined inside of the inner cylindrical wall 28; the outer cavity 32 is an annular space located between the inner cylindrical wall 28 and the outer cylindrical wall 20. The inner cylindrical wall 28 has a plurality of axially-extending slots 34 formed therein to define passages between the inner cavity 30 and the outer cavity 32. The slots 34 are preferably distributed equally around the circumference of the inner cylindrical wall 28. Each slot 34 has a width that is sufficient to allow the zip tie strap 14 to pass but is narrower than the head 16 so that the head 16 is prevented from passing through the slot 34. The slots 34 are shown as having angled edges to facilitate passage of the strap 14, but could also be formed with non-angled edges.

The container 10 further includes two flexible orifices 36 mounted in the housing 26 that are large enough to allow the zip tie 12, as well as a user's thumb or finger, to pass therethrough. In the illustrated embodiment, one of the flexible orifices 36 is provided in the lower wall 22 and the other is provided in the upper wall 24. Specifically, each of the lower and upper disk-shaped walls 22, 24 has a circular port 38 formed in the center thereof. A circular sheet 40 of a flexible material is affixed in each one of the ports 38. Each flexible sheet 40 has a number of diametrical slits formed therein that intersect at the center of the sheet 40. The properties of the flexible sheet material combine with the slit configuration to produce sheets 40 that are pliable enough to deform and create an opening in response to application of sufficient force and stiff enough to maintain the closed state shown in FIGS. 1 and 2 when little or no force is being applied. This arrangement provides a penetrable orifice through which objects (such as zip ties, thumbs, and fingers) can be pushed, after which the flexible sheet 40 returns to its normal, closed state.

In the illustrated embodiment, the ports 38 are aligned with the inner cylindrical wall 28 and have the same diameter as the inner cylindrical wall 28. The flexible orifices 36 thus oppose one another and provide direct access to the inner cavity 30. It should be noted that while the flexible orifices 36 are shown as being circular in shape, they can be any shape and size that permits the zip tie 12, as well as a user's thumb or finger, to pass therethrough.

The container 10 also has a series of guides 42 provided on top of the upper wall 24 to direct the zip tie 12 out of the housing 26 and facilitate bending the zip tie 12 in a direction opposite the coil. The illustrated embodiment includes five guides 42 distributed about the circumference of the upper wall 24 and located radially beyond the flexible orifice 36. Each guide 42 comprises a pair of parallel, radially oriented rails 44 formed on top of the upper wall 24. Each pair of rails 44 are spaced apart a distance that is equal to or slightly greater than the width of the zip tie strap 14 so that the strap 14 can fit in the guide 42.

In addition, a friction fit passage 46 is provided on top of the upper wall 24. The friction fit passage 46 comprises a pair of the parallel, radially oriented rails 44 formed on top of the upper wall 24, and a flexible flange 48 attached to the upper edge of each rail 44 and extending inward. The flanges 48 define a gap therebetween. The friction fit passage 46 is sized to snugly receive the zip tie strap 14 so that the zip tie 12 can be retained by a friction fit. Although not shown in the drawings, guides 42 and/or a friction fit passage 46 can also be provided on the lower wall 22.

To store the zip tie 12 in the container 10, the pointed tip 18 of the zip tie 12 is inserted into the inner cavity 30 of the container 10 through one of the flexible orifices 36. The pointed tip 18 is directed through one of the slots 34 of the inner cylindrical wall 28 into the outer cavity 32, where the strap 14 coils as shown in FIG. 2. The coiling of the strap 14 permits the zip tie 12 to be stored in a relatively small volume. For instance, a coiled 22-inch zip tie could be stored in a container having a diameter of approximately 2.5 inches. The head 16 of the zip tie 12, and a portion of the strap 14, remains in the inner cavity 30, held there by the flexible orifices 36 which are sufficiently stiff to not open under the weight of the head 16. To deploy the stored zip tie 12, the user sticks a finger or thumb through one of the flexible orifices 36 so as to push the zip tie head 16 through the other flexible orifice 36. The user can then grasp the head 16 and extract the zip tie 12 by pulling it the rest of the way out of the container 10. In doing so, the strap 14 can be pulled through one of the guides 42 in an orientation opposite the direction the zip tie 12 was coiled in the container 10, thereby straightening zip tie 12.

Figure 3:
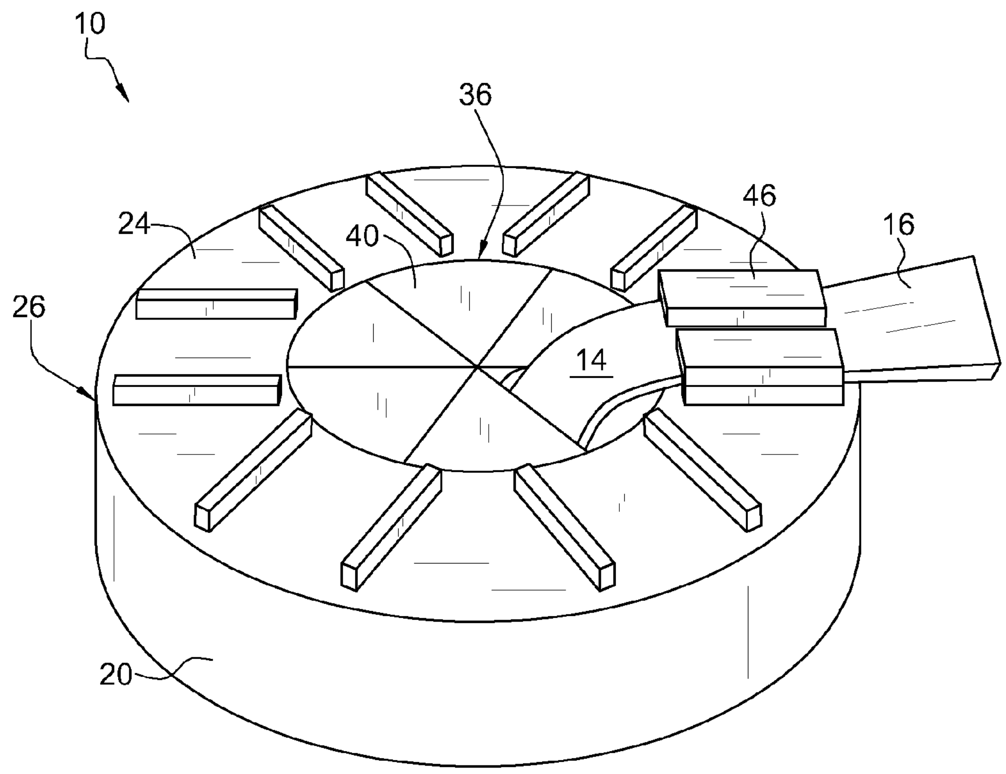
FIG. 3 is a perspective view of the container of FIG. 1 showing an alternative manner of storing and deploying zip ties.

Referring to FIG. 3, an alternative manner for storing the zip tie 12 in the container 10 is shown. In this case, the pointed tip 18 of the zip tie 12 is inserted into the friction fit passage 46 from its outermost end. The pointed tip 18 is fed entirely through the passage 46 and then through the adjacent flexible orifice 36 into the inner cavity 30. From there, the pointed tip 18 is directed through one of the slots 34 of the inner cylindrical wall 28 into the outer cavity 32, where the strap 14 coils. The head 16 of the zip tie 12 remains outside of the container 10, abutting the friction fit passage 46, while the portion of the strap 14 adjacent to the head 16 is held by a friction fit in the passage 46. The stored zip tie 12 is deployed by the user grasping the head 16 pulling the zip tie 12 out of the container 10 and through the friction fit passage 46.

Figure 4:
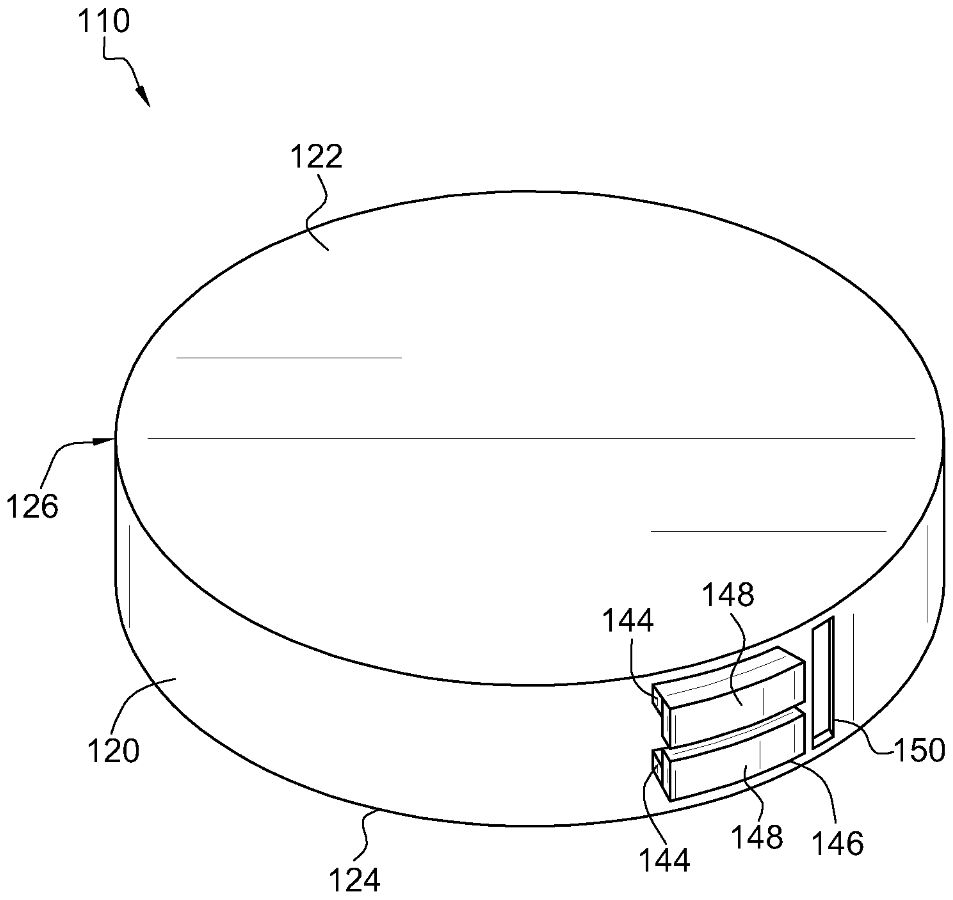
FIG. 4 is a perspective view of another embodiment of a container for carrying and dispensing zip ties.
Figure 5:
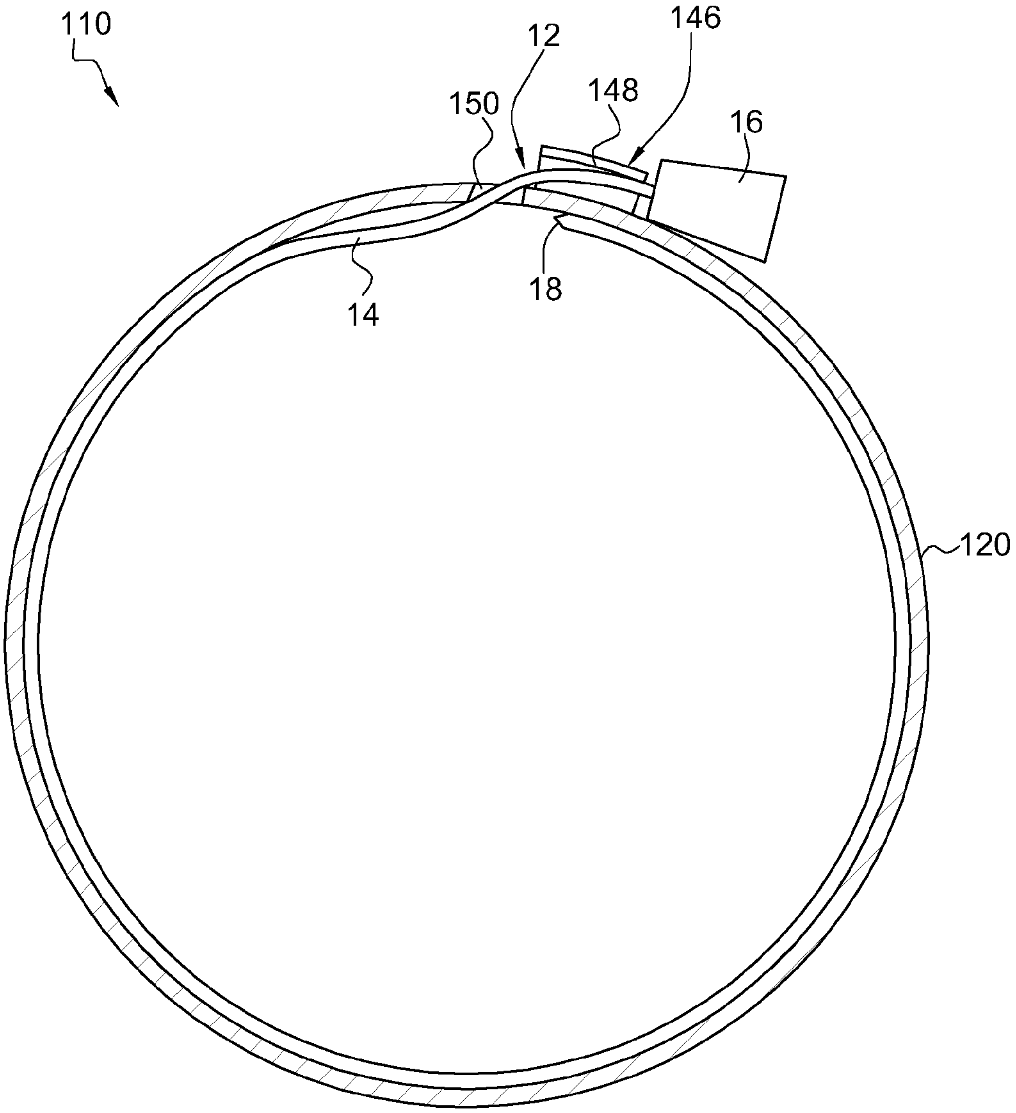
FIG. 5 is a sectional top view of the container of FIG. 4.

Turning to FIGS. 4 and 5, another embodiment of a container 110 for carrying and dispensing at least one zip tie 12 is shown. The container 110 comprises an outer cylindrical wall 120, a disk-shaped upper wall 122 attached to the top of the outer cylindrical wall 120, and a disk-shaped lower wall 124 attached to the bottom of outer cylindrical wall 120 to define an enclosure or housing 126 having a substantially hollow interior. The housing 126 is thus generally cylindrical in shape, with a height that is substantially less than its diameter. The diameter of the housing 126 is sufficient to contain a coiled zip tie of a desired length in the manner described below. The height of the outer cylindrical wall 120, and thus the height of the housing 126, is slightly greater than the width of the zip tie 12 to be stored in the container 110. For example, the height can be approximately 10 percent greater than the zip tie width.

A dispensing slot 150 is formed in the outer cylindrical wall 120. The dispensing slot 150 preferably extends axially with respect to the housing 126 and is sized to permit the zip tie strap 14, but not the head 16, to pass through. A friction fit passage 146 is provided on the outer cylindrical wall 120, adjacent to the dispensing slot 150. The friction fit passage 146 comprises a pair of the parallel rails 144 formed on the outer cylindrical wall 120 that extend in a circumferential direction. A flexible flange 148 is attached to the outer edge of each rail 144 and extends inward. The flanges 148 define a gap therebetween. The friction fit passage 146 is sized to snugly receive the zip tie strap 14 so that the zip tie 12 can be retained by a friction fit.

To store the zip tie 12 in the container 110, the pointed tip 18 of the zip tie 12 is inserted into the friction fit passage 146 from its end opposite the dispensing slot 150. The pointed tip 18 is fed entirely through the passage 46 and then through the dispensing slot 150 into the interior of the housing 126, where the strap 14 coils as shown in FIG. 5. The head 16 of the zip tie 12 remains outside of the container 110, abutting the friction fit passage 146, while the portion of the strap 14 adjacent to the head 16 is held by a friction fit in the passage 146. The stored zip tie 12 is deployed by the user grasping the head 16 pulling the zip tie 12 out of the container 110 and through the friction fit passage 146.

Another embodiment of a container for carrying and dispensing at least one zip tie can comprise a combination of the two embodiments described above. In other words, this embodiment would have a round housing defining inner and outer cavities and with a flexible orifice provided on each of the lower and upper walls. The housing would also have a dispensing slot formed in its outer cylindrical wall, with a friction fit passage provided on the outer cylindrical wall adjacent to the dispensing slot. Such a container would provide the user with multiple options for storing a zip tie for easy deployment.

While specific embodiments of the present invention have been described, it should be noted that various modifications thereto can be made without departing from the spirit and scope of the invention as defined in the appended claims.

What is claimed is:

1. A container for carrying and dispensing at least one zip tie having a strap and a head connected to one end of said strap, said container comprising:

a substantially cylindrical housing having an axis of symmetry therethrough and having a continuous, rounded outer wall and opposing upper and lower disk-shaped walls, the upper and lower disk-shaped walls having a diameter, wherein said housing defines a substantially hollow interior;

an inner wall formed inside said housing to divide said housing interior into an inner cavity and an outer cavity, said inner wall having at least one slot formed therein to define a passage between said inner cavity and said outer cavity;

a first flexible orifice provided in said upper wall;

a second flexible orifice provided in said lower wall;

a dispensing slot formed in said outer wall, said dispensing slot being substantially linear and coaxial with the axis of symmetry of substantially cylindrical housing; and a friction fit passage formed on said outer wall adjacent to said dispensing slot, wherein said outer wall defines a height that is substantially less than the diameter of the upper and lower walls, and wherein said friction fit passage and said dispensing slot are configured to retain a first portion of said zip tie strap within said container and extending through said dispensing slot and a second portion of said zip tie strap within said friction fit passage, said second portion of said zip tie strap connected to said zip tie head proximate said friction fit passage, opposite said dispensing slot.

2. The container of claim 1 wherein said outer wall is cylindrical and said inner wall is cylindrical and has a diameter that is less than the diameter of said outer wall.

3. The container of claim 2 wherein said inner wall is positioned concentrically with said outer wall.

4. The container of claim 1 further comprising at least one guide formed on said upper wall.

5. The container of claim 1 further comprising a friction fit passage formed on said upper wall.

6. The container of claim 1, wherein said upper and lower walls are mutually parallel.

7. The container of claim 1, wherein said friction fit passage comprises:

a pair of mutually parallel, circumferentially extending rails, each of said rails having a first edge disposed on said outer wall and a second edge distant from said outer wall, a pair of mutually parallel, arcuate flexible flanges, each of said flanges being equidistant from said outer wall and having a first edge proximate to and equidistant from a respective one of said upper and lower walls and having a second, opposite edge distant from said respective one of said upper and lower walls, said first edge of each of said pair of flanges being contiguous with the second edge of a respective one of said pair of rails, wherein said second edges of said flanges defining a gap therebetween.

8. The container of claim 7, wherein the width between said first and second rails and the height of said first and second rails are sized in order to snugly receive said zip tie between said outer wall, said first and second rails, and said flanges.

* * * * *